(12) United States Patent
Henderson et al.

(10) Patent No.: US 9,809,415 B2
(45) Date of Patent: Nov. 7, 2017

(54) MOUNTING ASSEMBLY FOR MOUNTING A SHEAVE ROLLER TO A CABLE TRAY

(71) Applicant: GREENLEE TEXTRON INC., Rockford, IL (US)

(72) Inventors: Damon Joseph Henderson, Rockford, IL (US); Corey Britton Dir, Rockford, IL (US)

(73) Assignee: TEXTRON INNOVATIONS INC., Providence, RI (US)

( * ) Notice: Subject to any disclaimer, the term of this patent is extended or adjusted under 35 U.S.C. 154(b) by 233 days.

(21) Appl. No.: 14/300,398

(22) Filed: Jun. 10, 2014

(65) Prior Publication Data

US 2015/0353319 A1    Dec. 10, 2015

(51) Int. Cl.
  *H02G 3/04*    (2006.01)
  *B65H 57/14*   (2006.01)
  *H02G 1/06*    (2006.01)

(52) U.S. Cl.
  CPC .............. *B65H 57/14* (2013.01); *H02G 1/06* (2013.01); *H02G 3/0456* (2013.01)

(58) Field of Classification Search
  CPC ........ H02G 1/08; H02G 3/0456; B65H 9/325; B65H 57/14; G02B 6/4466; G02B 6/48; G02B 6/508
  See application file for complete search history.

(56) References Cited

U.S. PATENT DOCUMENTS

| | | | | | |
|---|---|---|---|---|---|
| 3,426,988 | A | * | 2/1969 | Bradshaw | H02G 1/04 138/106 |
| 3,602,467 | A | * | 8/1971 | Thomas | H02G 1/08 248/210 |
| 3,770,233 | A | * | 11/1973 | McElroy | H02G 1/08 248/55 |
| 3,941,341 | A | * | 3/1976 | Brogdon, Jr. | E06C 7/12 182/129 |
| 4,017,047 | A | | 4/1977 | Brogdon, Jr. et al. | |
| 4,358,089 | A | * | 11/1982 | Metcalf | H02G 1/08 248/231.71 |
| 5,509,671 | A | * | 4/1996 | Campbell | B62B 1/264 242/557 |

(Continued)

FOREIGN PATENT DOCUMENTS

WO    2010/062813 A1    6/2010

OTHER PUBLICATIONS

Greenlee Sheave-Tray (658), 1 page.

(Continued)

*Primary Examiner* — Bradley Duckworth
(74) *Attorney, Agent, or Firm* — Kilworth & Rozenblat IP LLP (57) ABSTRACT

A mounting assembly is provided for mounting a sheave roller to a ladder-type cable tray. The cable cables can be laid on the cable tray for routing through a building. The mounting assembly includes first and second housing parts which are moveable relative to each other. The housing parts are attached to respective rungs of the cable tray. A lock prevents the relative movement of the housing parts relative to each other once the mounting assembly is engaged with the cable tray. The sheave roller is rotatably attached to the one housing part. This quickly and easily installs the sheave roller on the cable tray.

24 Claims, 4 Drawing Sheets

(56) References Cited

U.S. PATENT DOCUMENTS

| | | | | |
|---|---|---|---|---|
| 5,779,229 | A | 7/1998 | Lirette | |
| 6,419,424 | B1 * | 7/2002 | Null | B65H 49/24 |
| | | | | 242/557 |
| 6,533,248 | B1 * | 3/2003 | Schafer | B65H 49/32 |
| | | | | 254/134.3 FT |
| 6,612,516 | B1 * | 9/2003 | Haines | B65H 49/32 |
| | | | | 242/397.1 |
| 6,729,606 | B1 * | 5/2004 | Durin | B65H 57/14 |
| | | | | 242/615.2 |
| 6,848,540 | B2 * | 2/2005 | Kvam | E06C 7/14 |
| | | | | 182/121 |
| 8,958,681 | B2 * | 2/2015 | Ripplinger | G02B 6/46 |
| | | | | 385/136 |
| 9,010,695 | B2 * | 4/2015 | Efraimsson | H02G 7/053 |
| | | | | 174/40 R |
| 2014/0150687 | A1 * | 6/2014 | Shaw | H02G 3/0456 |
| | | | | 105/329.1 |

OTHER PUBLICATIONS

Greenlee Sheave-Tray (659), 1 page.
www.specialisedforce.com.au; XP055215315; Dec. 5, 2013; 56 pages.
www.canadastoocrib.com; XP055215558; Jun. 30, 2012; 1 page.
Anonymous: "Aerial Cable Laying Equipement"; XP055215305; Dec. 31, 2013; 6 pages.
European Search Report for EP 15170424 dated Nov. 18, 2015, 9 pages.
European Communication for Corresponding European Patent Application No. 15170424.4 dated Aug. 1, 2016.
European Communication for Corresponding European Patent Application No. 15170424.4 dated Mar. 16, 2017.

* cited by examiner

MOUNTING ASSEMBLY FOR MOUNTING A SHEAVE ROLLER TO A CABLE TRAY

FIELD OF THE INVENTION

The present invention relates generally to cable pulling, and specifically relates to a mounting assembly for attaching a sheave roller to a cable tray.

BACKGROUND OF THE INVENTION

Cable trays are commonly used in industrial-type buildings for routing cable. The cable lays on top of the cable tray and is visible. The cable can be easily changed and additional cables can be easily added. When pulling cables into a cable tray, a guide system is required to control the cable location since a full enclosure (conduit) is not provided. Prior art guide systems have rollers over which the cable rolls as it is being pulled along the cable tray.

Many current cable pulling accessories/pullers are fastened using loose pieces, such as screws and nuts that can easily be lost, dropped, or require extra hardware or hands to install quickly. Other attachment methods include screw-driven clamps that require handles and repetitive twisting motion to grab onto one or both sides of the cable tray. Cam locks also exist, but require users to adjust settings if desiring use on a wider range of tray sizes.

One example of a cable tray including a pulling mechanism is shown in U.S. Pat. No. 5,779,229. The cable tray includes a tray member defining a predetermined path and mounted in the ceiling of a building to support a plurality of cables extending from a dedicated room to a plurality of workstations. The pulling mechanism includes a pulling rope defining a closed circuit and mounted to the tray member through pulleys for longitudinal movements along the predetermined path. The pulling rope is provided with a cable securing element to which cables to be installed from the dedicated room to the workstations may be attached. Longitudinal movements of the pulling rope along the predetermined path displace the cable securing element and the cables attached to it from the dedicated room towards the workstation.

In the present invention, a mounting assembly is provided for attaching a sheave roller to a cable tray. The mounting assembly provides improvements to the existing prior art and overcomes the disadvantages presented by the prior art. Other features and advantages will become apparent upon a reading of the attached specification, in combination with a study of the drawings.

SUMMARY OF THE INVENTION

A mounting assembly is provided for mounting a sheave roller to a cable tray. The cables can be laid on the cable tray for routing through a building. The mounting assembly includes first and second housing parts which are moveable relative to each other. The housing parts are attached to respective rungs of the cable tray. A lock prevents the relative movement of the housing parts relative to each other once the mounting assembly is engaged with the cable tray. The sheave roller is rotatably attached to the one housing part. This quickly and easily installs the sheave roller on the cable tray.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity.

Figure 2:
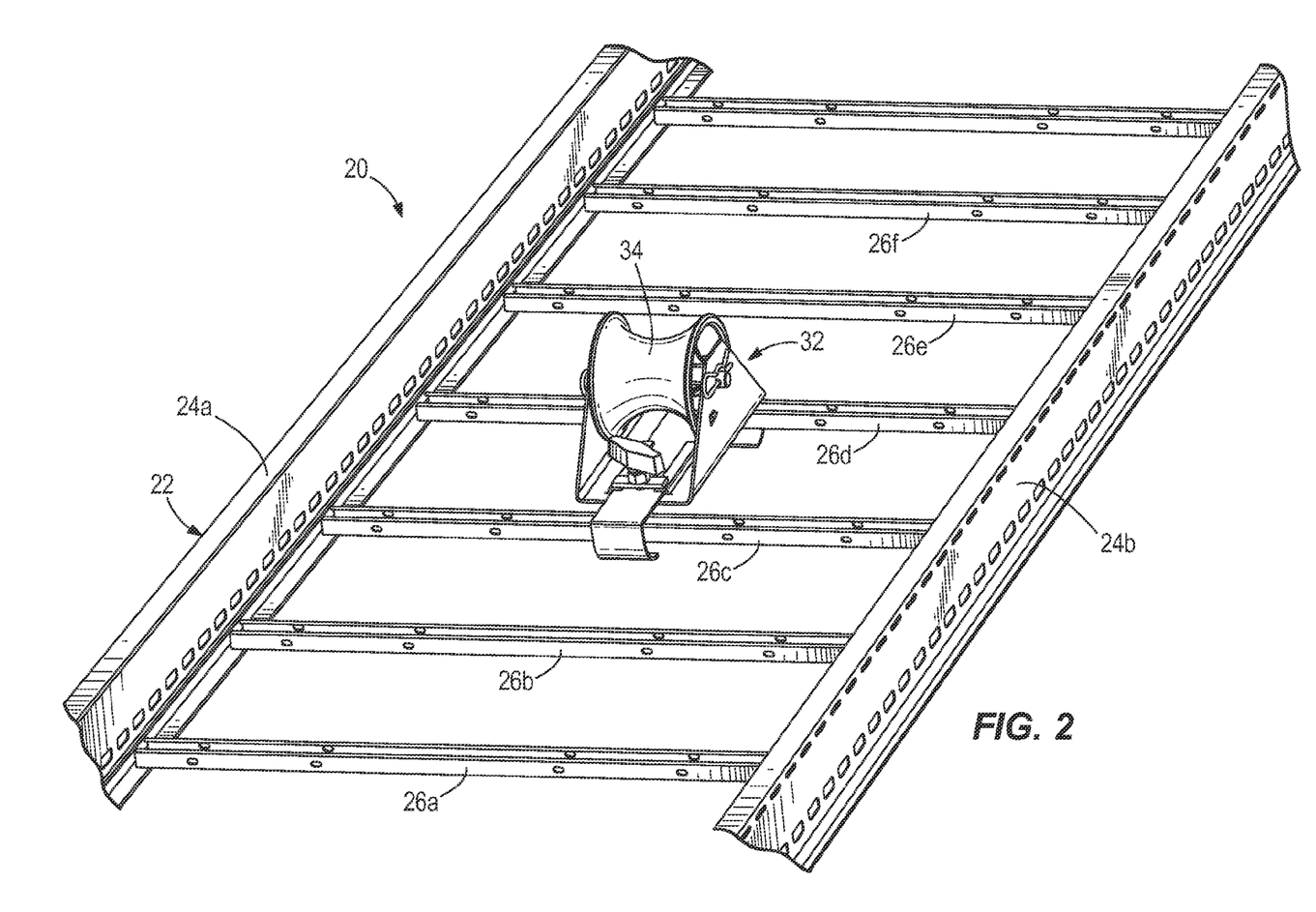
FIG. 2 is a perspective view of the sheave roller and its mounting assembly, attached to a cable tray.

As is known in the art, a cable tray 20 is formed of a base 22 hung from the ceiling of a building by tray hangers (not shown) which may be formed of threaded rods, which attach between the base 22 and the ceiling. The base 22 is formed of a ladder-type rack having a pair of rails 24a, 24b with a plurality of spaced apart rungs 26a, 26b, 26c, 26d, 26e, 26f, etc. extending between the rails 24a, 24b. Each rung 26a, 26b, 26c, 26d, 26e, 26f, etc. has an upper surface upon which cable is laid for routing through the building, and each rung 26a, 26b, 26c, 26d, 26e, 26f, etc. has an opposite lower surface. Cable trays 20 are commonly formed out of aluminum, fiberglass or steel. As is known in the art, cable trays 20 can be used instead of conduit.

Figure 1:
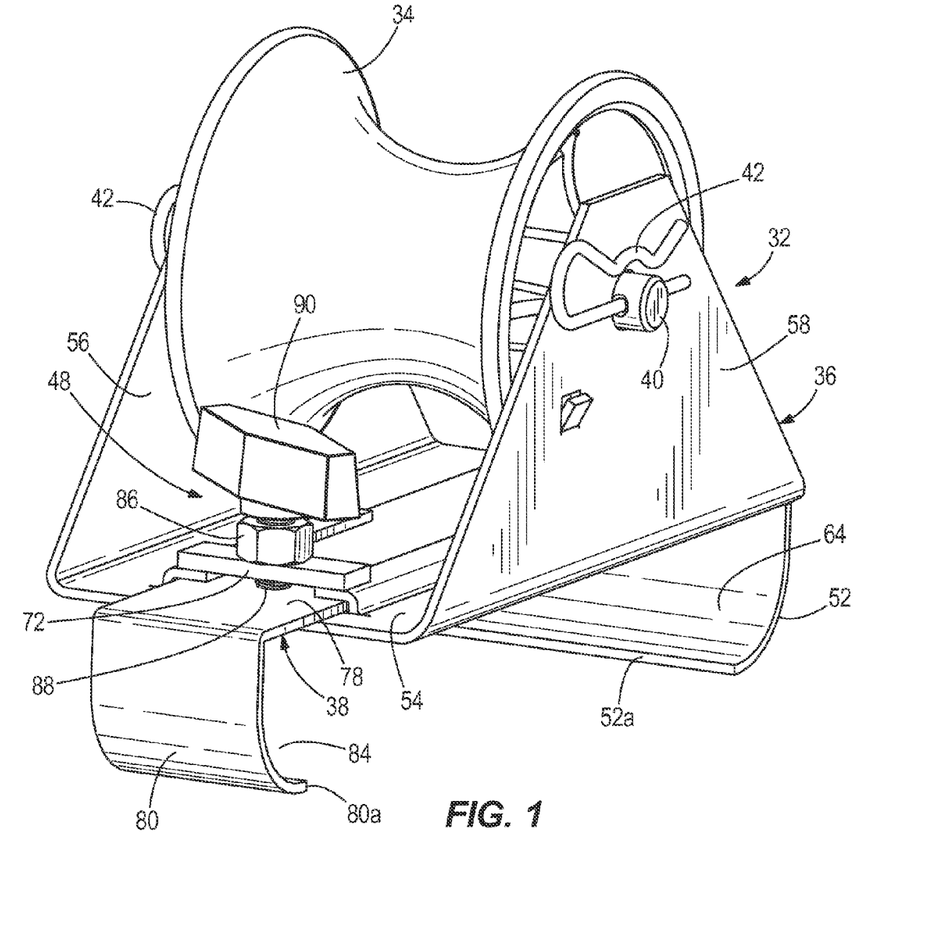
FIG. 1 is a perspective view of a sheave roller having a mounting assembly which incorporates the features of the present invention.
Figure 3:
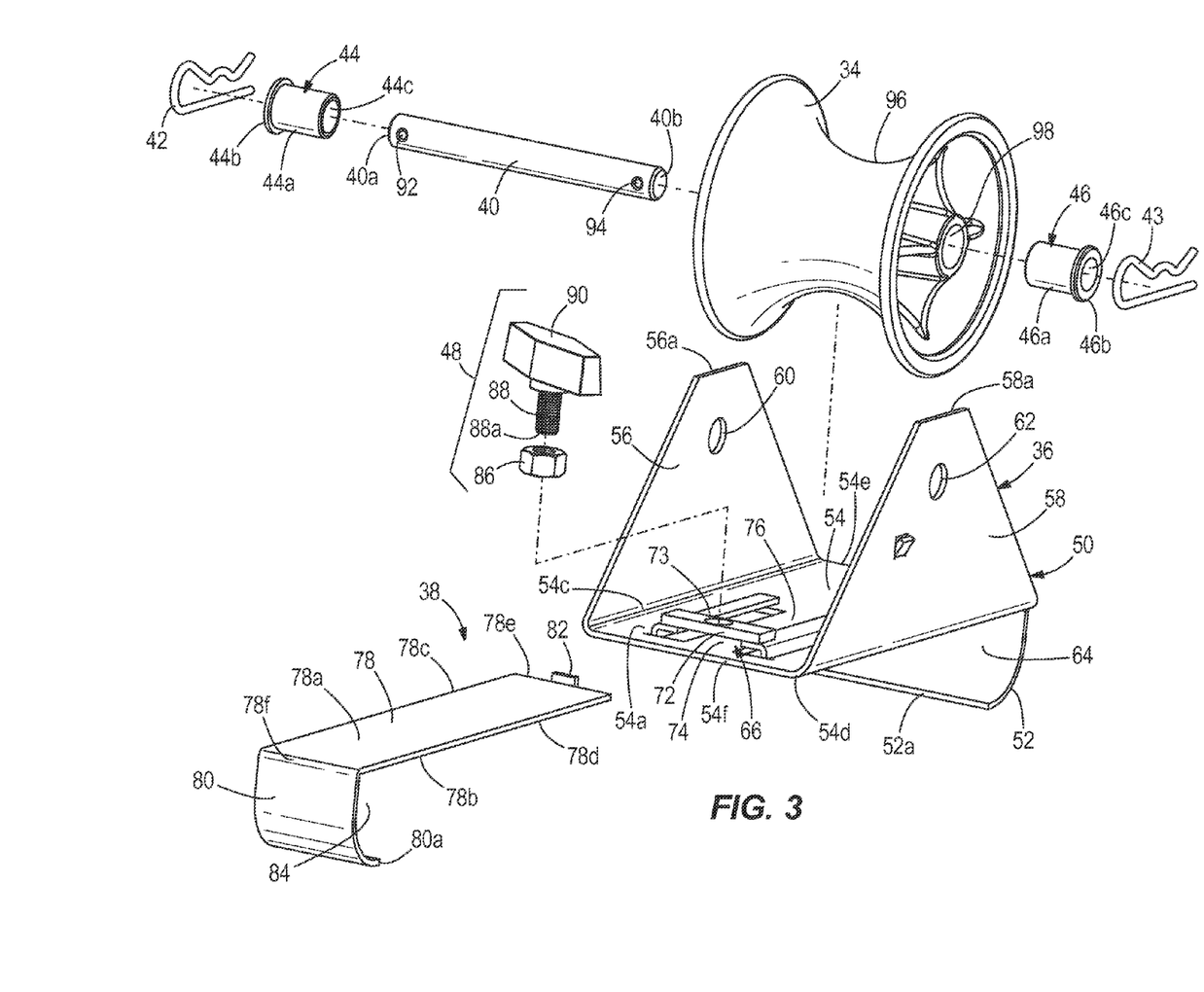
FIG. 3 an exploded perspective view of the sheave roller and its mounting assembly.

The present invention provides a mounting assembly 32 to mount a sheave roller 34 to the cable tray 20. The mounting assembly 32 quickly and easily installs onto the cable tray 20, and quickly and easily disengages from the cable tray 20. The mounting assembly 32 includes a first and second housing parts 36, 38 which are moveable relative to each other, a pin 40 attached to the first housing part 36 and which is secured to the first housing part 36 by clips 42, 43, such as cotter pins, first and second bearings 44, 46 mounted on the pin 40, and a lock 48 for locking the two housing parts 36, 38 in place relative to each other. The components of the mounting assembly 32 are preferably made of metal or plastic, but may be other materials.

Figure 4:
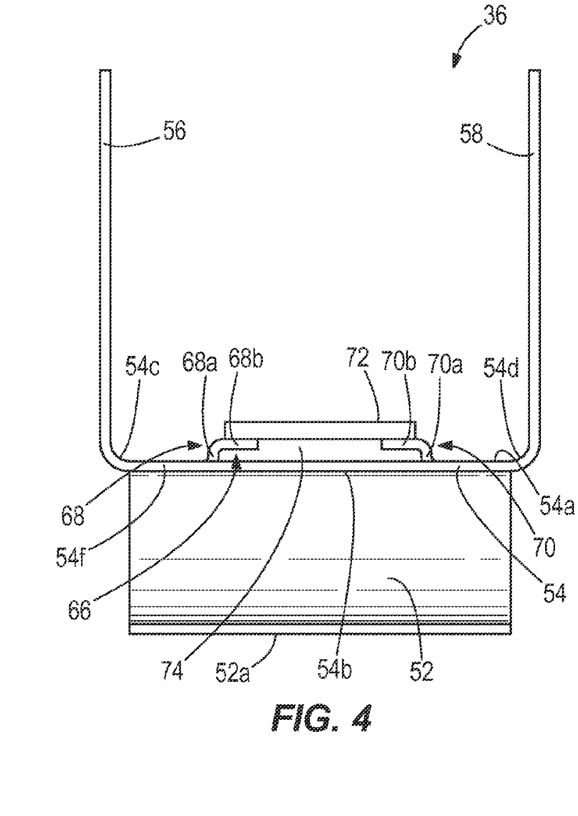
FIG. 4 is an end elevation view of the first housing part of the mounting assembly.
Figure 5:
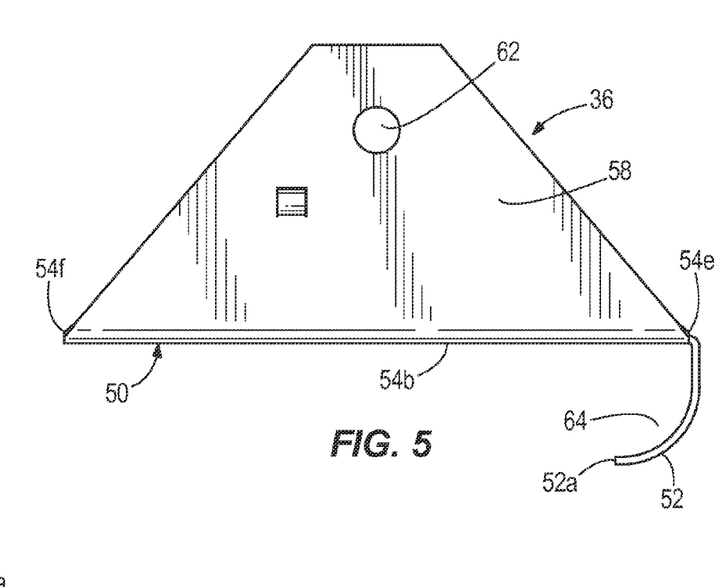
FIG. 5 is a side elevation view of the first housing part of the mounting assembly.

The first housing part 36 includes a base 50 having an arm 52 extending therefrom. The base 50 includes a planar bottom wall 54 having upper and lower surfaces 54a, 54b, first and second opposite edges 54c, 54d, and third and fourth opposite edges 54e, 54f which extend between the first and second edges 54c, 54d. The bottom wall is preferably rectangular but may take other shapes. The base 50 further includes a first side wall 56 extending perpendicularly upwardly from the first edge 54c of the bottom wall 54, and a second side wall 58 extending perpendicularly upwardly from the second edge 54b of the bottom wall 54. Each side wall 56, 58 has an aperture 60, 62 therethrough proximate to an upper end 56a, 58a thereof. As shown, the side walls 56, 58 are triangular, but may take other shapes. The arm 52 extends downwardly from the third edge 54e of the bottom wall 54. The arm 52 is curved such that it curves downwardly and then below the lower surface 54b of the bottom wall 54 and toward the fourth edge 54f. The arm 52 ends at end 52a which is below the bottom wall 54 and spaced from the bottom wall 54. A rung retaining pocket 64 is formed by the arm 52 and the bottom wall 54. The arm 52 may take a variety of forms, such as curved as shown, L-shaped or U-shaped, provided that the rung retaining pocket 64 is formed.

The first housing part 36 further includes a retention guide 66 which extends from the upper surface 54a of the bottom wall 54. The retention guide 66 includes first and second side walls 68, 70 which are spaced apart from each other and a top wall 72. Each side wall 68, 70 is generally L-shaped, with a first leg 68a, 70a that extends upwardly from the upper surface 54a of the bottom wall 54, and a second leg 68b, 70b which extends toward the opposite side wall 68, 70. Each side wall 68, 70 starts at a position which is proximate to, but spaced from, the fourth edge 54f of the bottom wall 54 and extends a predetermined distance toward the third edge 54e of the bottom wall 54. The top wall 72 is attached to each second leg 68b, 70b at the end which is proximate to the fourth edge 54f of the bottom wall 54. A passageway 74 between the bottom wall 54, the side walls 68, 70 and the top wall 72. The top wall 72 is suitably attached to the side walls 68, 70, such as by welding or fasteners. Rearwardly of the passageway 74, the bottom wall 54 and the side walls 68, 70 define a second housing part retention space 76 which is aligned with the passageway 74. The top wall 72 has an aperture 73 therethrough.

Figure 6:
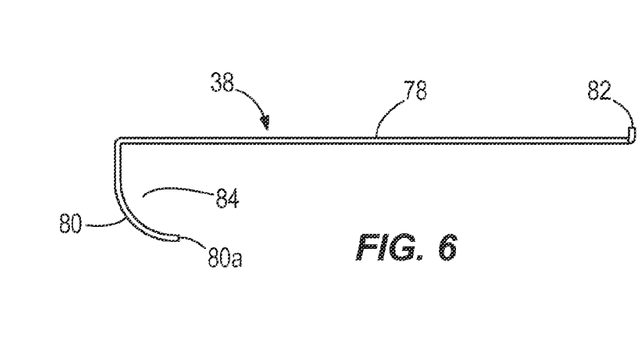
FIG. 6 is a side elevation view of the second housing part of the mounting assembly.

The second housing part 38 includes a base 78 having an arm 80 extending therefrom. The base 78 generally conforms to the shape of the passageway 84 and the second housing part retention space 76. As shown, the base 78 is thus rectangular having upper and lower surfaces 78a, 78b, first and second opposite edges 78c, 78d, and third and fourth opposite edges 78e, 78f which extend between the first and second edges 78c, 78d. A tab 82 extends upwardly from the third edge 78e of the base 78. The arm 80 extends downwardly from the fourth edge 78f of the base 78. The arm 80 is curved such that it curves downwardly and then below the lower surface 78b of the base 78 toward the third edge 78. The arms 80 ends at end 80a. A rung retaining pocket 84 is formed by the arm 52 and the bottom wall 54. The arm 80 may take a variety of forms, such as curved as shown, L-shaped or U-shaped, provided that the rung retaining pocket 84 is formed.

To assemble the first and second housing parts 36, 38, the base 78 of the second housing part 38 is inserted into the retention guide 66. The first legs 68a, 70a of each side wall 68, 70 is proximate to the respective third and fourth edges 78e, 78f of the base 78, and the second leg 68b, 70b of each side wall 68, 70 overlaps the upper surface 78a of the base 78. The tab 82 is positioned in the second housing part retention space 76. Thereafter, the top wall 72 is attached to the side walls 68, 70. As such, the second housing part 38 is moveable relative to the first housing part 36, but cannot be detached from the first housing part 36. The ends 52a, 80a of the arms 52, 80 face each other.

The lock 48 locks the first and second housing parts 36, 38 in place relative to each other. The lock 48 may take a variety of forms and is not limited to that shown and described herein. As shown, the lock 48 includes a nut 86 with a set screw 88 which extends through the nut 86 and through the aperture 73 in the top wall 72. The set screw 88 has a knob 90 at its end so that a user can easily grasp the set screw 88 for rotating it. In use, once the second housing part 38 is in a desired position relative to the first housing part 36, the user turns the set screw 88 until the lower end 88a engages the upper surface 78a of the base 78 of the second housing part 38. This frictional engagement prevents the movement of the second housing part 38 relative to the first housing part 36. The bottom wall 54 may also have an aperture (not shown) which aligns with the aperture 73 in the top wall 72 such that the end 88a of the set screw 88 further passes therethrough to secure the housing parts 36, 38 together. Other locks may be provided, for example, but not limited to a spring-loaded pin attached to the top wall 72.

The pin 40 is cylindrical having first and second ends 40a, 40b. An aperture 92, 94 is provided through the respective ends 40a, 40b. Each aperture 92, 94 accepts one of the clips 42, 43 as described herein.

The bearings 44, 46 are conventional, and may be formed as two-part bearings. The bearings 44, 46 mount on the ends of the pin 40. Each bearing 44, 46 has a body 44a, 46a from which a flange 44b, 46b extends outwardly. A central passageway 44c, 46c is formed through the bearings 44, 46. When mounted on the pin 40, the flange 44b on the first bearing 44 is proximate to the first end 40a of the pin 40, and the flange 46b on the second bearing 46 is proximate to the second end 40b of the pin 40.

The sheave roller 34 is conventional. The outer surface of the sheave roller 34 has a curved groove 96 which extends around the circumference of the sheave roller 34. A central passageway 98 extends through the center of the sheave roller 34.

To assemble the sheave roller 34 with the mounting assembly 32, the body 44a, 46a of the bearings 44, 46 are inserted into the ends of the passageway 98, such that the flanges 44b, 46b are proximate to side surfaces of the sheave roller 34. The sheave roller 34 and attached bearings 44, 46 are then positioned between the side walls 56, 58 of the first housing part 36 such that the passageways 44c, 46c, 98 align with the apertures 60, 62 in the side walls 56, 58 of the first housing part 36. The end 40b of the pin 40 is then inserted through the aperture 60 in the first side wall 56, through the passageway 44c of the first bearing 44, through the passageway 98 of the sheave roller 34, through the passageway 46c of the second bearing 46, and then through the aperture 62 in the second side wall 58. Alternatively, the pin 40 can then be inserted through these components in the reverse direction. The ends 40a, 40b of the pin 40 extend outwardly from the side walls 56, 58 such that the apertures 92, 94 are exposed. Clip 42 is inserted through the aperture 92 and clip 43 is inserted through aperture 94 to secure the sheave roller 34, the bearings 44, 46 and the pin 40 to the first housing part 36. The sheave roller 34 can freely rotate relative to the first housing part 36.

In use, the sheave roller 34 and its mounting assembly 32 are attached to adjacent rungs of the cable tray 20, for example, rungs 26c, 26d. The first housing part 36 is laid on one rung 26d such that the base 54 seats on the upper surface of the rung 26d and the arm 52 extends between the rung 26d and the adjacent rung 26e. The second housing part 38 is extended from the first housing part 36 such that the base 78 seats on the upper surface of adjacent rung 26c and the arm 80 extends between the rung 26c and the adjacent rung 26b. The engagement of the tab 82 with the top wall 72 prevents the second housing part 38 from being pulled outwardly from the first housing part 36. Next, the first housing part 36 is moved toward the rung 26d until the rung 26d seats within the rung retaining pocket 64, with the end 52a of the arm 52 underneath the lower surface of the rung 26d. Thereafter, the second housing part 38 is slid into the first housing part 36 to move the second housing part 38 toward the first housing part 36 and toward the rung 26c until the rung 26c seats within the rung retaining pocket 84, with the end 80a of the arm 80 underneath the lower surface of the rung 26c. The lock 48 is then engaged to prevent further relative movement between the housing parts 36, 38. This secures the mounting assembly 32 to the rungs 26c, 26d.

The sheave roller 34 is then ready for use. Cables are laid in the groove 96 of the sheave roller 34 and can be easily pulled along the cable tray. The sheave roller 34 freely rotates as cable is drawn across the sheave roller 34. Multiple sheave rollers 34/mounting assemblies 32 can be provided along the length of the cable tray 20, as necessary.

The sheave roller 34 and its mounting assembly 32 are lightweight and sets up quickly and easily. The mounting assembly 32 accommodates a wide variety of rung spacing, for example, 6", 9", 12", 18" rung spacing.

The sheave roller 34 and its mounting assembly 32 can be easily disassembled from the cable tray 20. To do so, the lock 48 is disengaged and the second housing part 38 is slid away from the first housing part 36 and from rung 26c until the end 80a of the arm 80 is disengaged from the rung 26c. The first housing part 36 is then moved away from rung 26d until the end 52a of the arm 52 is disengaged from the rung 26d. The sheave roller 34 and its mounting assembly 32 are then lifted away from the cable tray 20.

The sheave roller 32 and its mounting assembly 34 can be positioned anywhere along the lengths of the rungs 26a, 26b, 26c, 26d, 26e, 26f, etc.

While a preferred embodiment of the present invention is shown and described, it is envisioned that those skilled in the art may devise various modifications of the present invention without departing from the spirit and scope of the appended claims.

What is claimed is:

1. In combination, a mounting assembly and a sheave roller, the mounting assembly configured to attach the sheave roller to a ladder-type cable tray having a plurality of spaced apart rungs, the combination comprising:
   the sheave roller; and
   the mounting assembly comprising a first housing part, said sheave roller being rotatably attached to said first housing part, said first housing part comprising a base and an arm extending from said base, said first housing part capable of being engaged with a rung of the cable tray, a second housing part configured to be slideable relative to said first housing part, said second housing part comprising a base and an arm extending from said base of the second housing part, said second housing part capable of being engaged with another one of the rungs of the cable tray, and a lock capable of being engaged with the first and second housing parts thereby preventing all movement between the first and second housing parts and capable of being disengaged to allow sliding movement between the first and second housing parts.

2. The combination of claim 1, wherein said base of said first housing part includes a retention guide thereon, the retention guide capable of engagement with the second housing part.

3. The combination of claim 2, wherein the retention guide is formed of a pair of L-shaped walls which engage with the second housing part.

4. The combination of claim 2, wherein the retention guide forms a passageway, the base of the second housing part extending through the passageway.

5. The combination of claim 4, wherein said lock is a set screw which extends through the retention guide and engages the second housing part.

6. The combination of claim 1, wherein each arm is curved relative to the respective base.

7. The combination of claim 1, wherein said lock is a set screw which extends through said first housing part and engages said second housing part.

8. The combination of claim 1, wherein the sheave roller is mounted to said base of said first housing part by a pin and bearings.

9. The combination of claim 1, wherein the sheave roller extends outwardly from the base of the first housing part in a first direction and the arm of the first housing part extends outwardly from the base of the first housing part in a second, opposite direction.

10. The combination of claim 1, wherein the lock comprises a set screw and a nut engaged with the set screw.

11. A combination comprising:
    a cable tray comprising a pair of rails and a plurality of spaced apart rungs extending between said rails, each rung defining a first surface upon which cables can be laid for routing through a building, each rung having a second surface which is opposite to the first surface;
    a sheave roller;
    a mounting assembly configured to mount the sheave roller onto the rungs of the cable tray, said mounting assembly comprising a first housing part, said sheave roller rotatably attached to said first housing part, said first housing part capable being engaged with a rung of the cable tray, a second housing part configured to be slideable relative to said first housing part, said second housing part capable of being engaged with another one of the rungs of the cable tray, and a lock capable of being engaged with the first and second housing parts thereby preventing all movement between the first and second housing parts and capable of being disengaged to allow sliding movement between the first and second housing parts.

12. The combination of claim 11, wherein said first housing part includes a retention guide thereon, the retention guide capable of engagement with the second housing part.

13. The combination of claim 12, wherein the retention guide is formed of a pair of L-shaped walls which engage with the second housing part.

14. The combination of claim 12, wherein the retention guide forms a passageway, and a portion of the second housing part extends through the passageway.

15. The combination of claim 14, wherein said lock is a set screw which extends through the retention guide and engages the second housing part.

16. The combination of claim 11, wherein said first housing part comprises a base and an arm extending from the base, and the second housing part comprises a base and an arm extending from the base.

17. The combination of claim 16, wherein each arm is curved relative to the respective base.

18. The combination of claim 11, wherein said lock is a set screw which extends through said first housing part and engages with said second housing part.

19. The combination of claim 11, wherein the sheave roller is mounted to said base of said first housing part by a pin and bearings.

20. The combination of claim 16, wherein the sheave roller extends outwardly from the base of the first housing part in a first direction and the arm of the first housing part extends outwardly from the base of the first housing part in a second, opposite direction, such that when the sheave roller and the mounting assembly are attached to the cable tray, the sheave roller and the base of the first housing part are on the same side of the spaced apart rungs.

21. The combination of claim 11, wherein the lock comprises a set screw and a nut engaged with the set screw.

22. The combination of claim 12, wherein said lock is a set screw which extends through the retention guide and engages with the second housing part.

23. In combination, a mounting assembly and a sheave roller, the mounting assembly configured to attach the sheave roller to a ladder-type cable tray having a plurality of spaced apart rungs, the combination comprising:
the sheave roller; and
the mounting assembly comprising a first housing part, the sheave roller being rotatably attached to the first housing part, the first housing part comprising a planar base having an upper surface and a lower surface, an arm extending from the lower surface of the base, and an aperture provided through the base, the first housing part capable of being engaged with a rung of the cable tray, a second housing part configured to be slideable relative to the first housing part, the second housing part comprising a base having an upper surface and a lower surface and an arm extending from the lower surface of the base of the second housing part, the lower surface of the base of the second housing part being positioned above the upper surface of the base of the first housing part, the second housing part capable of being engaged with another one of the rungs of the cable tray, and a lock capable of being engaged through the aperture and with the second housing part thereby preventing the relative movement of the first and second housing parts and capable of being disengaged to allow the relative movement of the first and second housing parts.

24. The combination of claim 23, wherein the lock is a set screw.

* * * * *

UNITED STATES PATENT AND TRADEMARK OFFICE
CERTIFICATE OF CORRECTION

PATENT NO.         : 9,809,415 B2
APPLICATION NO.    : 14/300398
DATED              : November 7, 2017
INVENTOR(S)        : Henderson et al.

Page 1 of 2

It is certified that error appears in the above-identified patent and that said Letters Patent is hereby corrected as shown below:

On the Title Page

In Item (74), in Column 2, Lines 1-2, delete "Kilworth & Rozenblat IP LLP" and insert -- Klintworth & Rozenblat IP LLP --, therefor.

In the Figure, delete " " and insert -- --, therefor.

In the Drawings

In Fig. 1, Sheet 1 of 4, delete " " and insert -- --, therefor.

In the Specification

In Column 3, Line 1, delete "second edge 54b" and insert -- second edge 54d --, therefor.

In Column 3, Line 8, delete "54f The" and insert -- 54f. The --, therefor.

In Column 3, Line 38, delete "passageway 84" and insert -- passageway 74 --, therefor.

In Column 3, Lines 47-48, delete "third edge 78." and insert -- third edge 78e. --, therefor.

In Column 4, Line 60, delete "base 54" and insert -- base 50 --, therefor.

Signed and Sealed this
First Day of May, 2018

Andrei Iancu
*Director of the United States Patent and Trademark Office*

In Column 5, Line 33, delete "sheave roller 32 and its mounting assembly 34" and insert -- sheave roller 34 and its mounting assembly 32 --, therefor.